United States Patent [19] [11] 3,966,379
O'Brien [45] June 29, 1976

[54] APPARATUS FOR MAKING CORRUGATED FLEXIBLE TUBING

[75] Inventor: Patrick William O'Brien, Springhead, near Oldham, England

[73] Assignee: Compoflex Company Limited, England

[22] Filed: Dec. 12, 1973

[21] Appl. No.: 424,051

Related U.S. Application Data

[62] Division of Ser. No. 773,859, Nov. 6, 1968, Pat. No. 3,793,423.

[30] Foreign Application Priority Data

Nov. 6, 1967 United Kingdom............... 50382/67
Dec. 20, 1967 United Kingdom............... 57933/67

[52] U.S. Cl............................... 425/327; 264/287; 425/336; 425/369; 425/371; 425/392; 425/404
[51] Int. Cl.²......................................... B29C 17/02
[58] Field of Search ........... 425/369, 370, 372, 384, 425/336, 387, 326, 392, 393, 397, 325, 327, DIG. 816, 335, 337, 371, 404; 264/103, 173, 209, 287, DIG. 52; 17/42

[56] References Cited
UNITED STATES PATENTS 2,347,101 4/1944 Harding........................ 425/392 X
3,024,496 3/1962 Colombo ........................ 425/384 X
3,169,274 2/1965 Colombo ........................ 425/384 X
3,314,110 4/1967 Missbach ....................... 425/384 X
3,349,156 10/1967 Zieg.............................. 425/370 X
3,399,262 8/1968 Quackenbush et al. ........ 425/392 X
3,510,383 5/1970 Yovanovich.................... 425/336 X
3,530,538 9/1970 Quackenbush .................... 425/384
3,714,311 1/1973 Stefanka........................ 425/326 X
3,732,046 5/1973 Martin et al.................... 425/336 X

FOREIGN PATENTS OR APPLICATIONS 303,205 2/1971 U.S.S.R............................. 264/173
330,977 3/1972 U.S.S.R.............................. 425/72

Primary Examiner—Francis S. Husar
Assistant Examiner—Mark Rosenbaum
Attorney, Agent, or Firm—Cushman, Darby & Cushman

[57] ABSTRACT

Apparatus for making corrugated flexible tubing such as the suction hose used in a vacuum cleaner comprises an extruder which extrudes tubular plastic material with annular corrugations, followed by a higher-speed haul-off device, a heater, a cooler, and a lower speed haul-off device, all placed to act on the corrugated tube as the latter is passing over a mandrel, so that the corrugations become compressed to a close-pitched condition by the speed differential of the haul-off devices, the condition being set by the action of the heater and cooler.

3 Claims, 2 Drawing Figures

U.S. Patent   June 29, 1976   3,966,379
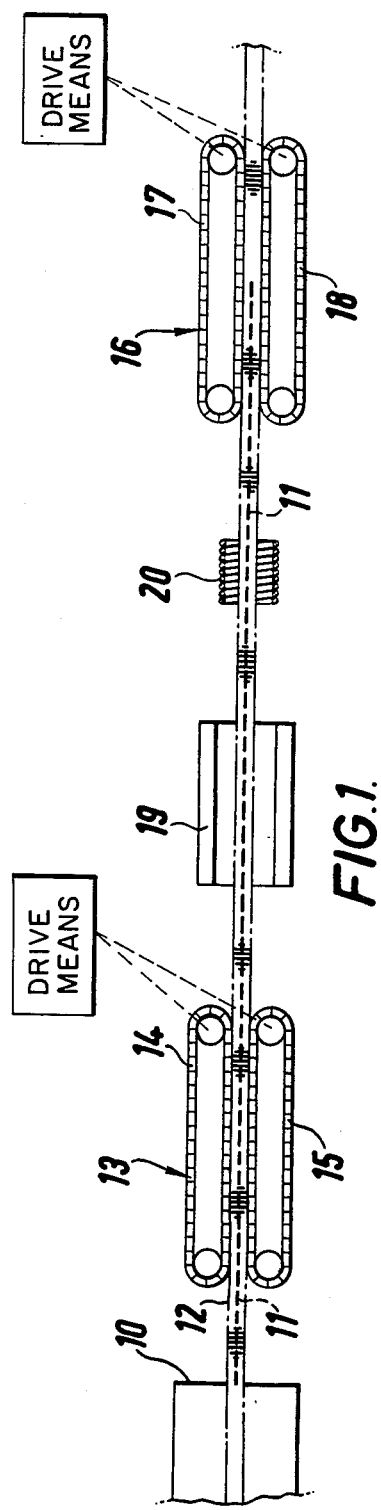
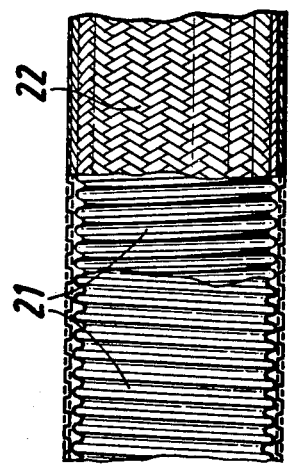

APPARATUS FOR MAKING CORRUGATED FLEXIBLE TUBING

This application is a divisional application of my co-pending application Ser. No. 773,859, filed Nov. 6, 1968, now U.S. Pat. No. 3,793,423.

It invention relates to improvements in flexible tubing and is concerned with corrugated tubing constructed wholly or mainly of plastics material particularly, but not propeller for use as hose for vacuum cleaners.

There are many factors which have to be taken into account in the construction of vacuum cleaner hose which is one of the most highly stressed hoses having regard to its weight, possible methods of construction and acceptable price. The primary requirements for a vacuum hose are flexibility, an absence of resistance to turning when used and an ability to withstand the crushing effect of being stood upon or shut in a door, coupled with high resistance to collapse when looped and pulled with the force applied by the average housewife or other operator. It should also be of attractive appearance to find a ready sales market and be of the lightest weight possible consistent with the necessary strength, to facilitate the use of the cleaner and reduce fatigue to the operator. The hose must be airtight and durable in service under all conditions and resistant to abrasion. There must be an absence of noise or whistle in operation and finally the manufacturing cost must be such that it can be sold at a price which will enable it to compete in a highly competitive market.

The present invention seeks to meet the desiderata outlined above and provides a process for the manufacture of corrugated flexible tubing which is formed of plastics material extruded with annular corrugations disposed longitudinally thereof wherein the annular corrugations are compressed longitudinally after extrusion into a close pitched condition. The corrugations are closed up or nearly closed up either by a continuous process on a mandrel after extrusion or the extrusion and corrugation and the closure of the corrugations may be a continuous process. The effect of closing the corrugations is to provide the hose with a substantially smooth internal bore which eliminates the tendency to whistling in operation above referred to. There is also a substantial improvement in airflow owing to the fact that the closing of the corrugations enables the hose to approximate to a smooth bore hose. Setting of the corrugations in compressed condition is advantageously facilitated by the application of heat which should be carefully controlled. The source of heat may be steam, hot air, fluids, electrical or electronic such as micro-wave high frequency dielectric or other suitable means.

In carrying out the process a light tubular mandrel is preferably attached to the extruder on to which the corrugated tubing is extruded and along which it is progressed and compressed by means of two devices frictionally engaging the tubing and operating at differential speeds. Advantageously, the tubing is passed successively through heating and cooling means located in spaced relation along the mandrel and disposed between the said devices. The said devices consist of caterpillar haul-offs each comprised of a pair of endless belts having padded surfaces disposed towards the mandrel which engage diametrically opposed surfaces of the tubing one of the said belts being driven clockwise and the other anti-clockwise, the device nearer the extruder being driven faster than that remote from the extruder and preferably at twice the speed thereof. The driven speed of the belts of the haul-off adjacent the extruder is advantageously slightly faster than the speed of extrusion.

Any of the plastics referred to illustrating pending applications Nos. 50382/67 and 57933/67 may be used in the construction of tubing in accordance with the invention but it is preferred to use polypropylene While the thickness of the wall will vary with the size of the bore of the hose for a normal vacuum hose a thickness of between 12 and 18 thousandths of an inch is suitable and preferably 15 thousands of an inch.

The tube may be compressed to such an extent that is loses approximately one third to one half its length in the compression process but the compression ratio, i.e. the ratio between the length of the tube as extruded and its length after compression varies with the profile of the corrugations. Generally, a compression ratio of 1.62 to 1 has been found to be most acceptable. It has also been found desirable in the case of hose of 1¼ inch bore in accordance with the invention to compress to such an extent that the hose will bend up to a radium of 1 inch to 1¼ inch. In the case of hose of 1½ inch bore the desirable bend radius is 1¼ inch to 1½ and in the case of hose of 1¾ inch bore, 1½ inch to 2 inches. With this compression the hose retains its flexibility. There is also a definite resistance to further bending caused by the fact that, since the corrugations are contiguous when the hose is bent, on the outside of the curve of the hose the corrugations open to their limit and then cease to open further while the corrugations on the inside of the bend are already touching one another and resist further compression. This fact prevents early collapse of the hose. If sufficient force is applied to bend the hose further, and very considerable force is necessary for this to be done, the hose can be caused to collapse but it sustains no damage and returns to its normal condition when the force is released. It has been found that resistance to crushing of hose compressed in accordance with the invention is increased by a factor of about 10 over smooth hose and as mentioned above the undesirable whistling noise associated with ordinary corrugated hose is eliminated.

Advantageously, the compressed hose may be braided preferably with high density polythene. If polythene tape is used a suitable width for the tape has been found to be 70 thousandths of an inch wide. Braiding protects the hose against abrasion and provides what is in effect a corset for the hose. It also further improves resistance to crushing. The braid does not interfere with the flexibility of the hose if applied at the correct tension and it prevents elongation of the hose and reinforces its resistance to bending after the desired bend radius has been reached. It also improves the appearance of the hose thereby rendering it more acceptable to the user.

As an alternative to, or in addition to the braiding above referred to, a plastic entruded cover may be applied to the hose. The plastic may be clear, opaque or suitably coloured. Instead of braiding with high density polythene, multi-strand cotton may be used as braiding and tapes of other plastics may be used but high density polythene is in general preferred.

The invention also consists in apparatus for manufacturing flexible tubing comprising an extruder adapted to extrude tubing of plastics material having annular corrugations longitudinally thereof, a mandrel attached to said extruder, a pair of caterpillar belts provided with frictional gripping means disposed adjacent said extruder and at opposite ends of a diameter of the mandrel and a second pair of like caterpillar belts disposed in like manner in relation to the mandrel at a point thereof remote from the extruder.

In order that the invention may be clearly understood and readily carried into effect the same will now be not limited with reference to the accompanying drawings in which:

FIG. 1 shows schematically apparatus for carring out just invention has water which FIG. 2 is a longitudinal section of a piece of flexible tubing manufactured according to the invention. housing 1

Referring to FIG. 1, 10 shows the end of the extruder. This may be of any form known for the production of corrugated flexible tubing and may for example form the tubing by means of a convoluting head as described in United Kingdom Letters Patent No. 1,098,092. Secured to the mouth of the extruder and advantageously to a mandrel thereof is a light tubular mandrel 11 on to which the tubing 12 is extruded. Adjacent the mouth of the extruder is disposed a device generally indicated by the reference 13 and known as caterpillar haul-off. This device consists of two driven caterpillar belts 14, 15, having gripping pads thereon. The belts are arranged diametrically opposite to one another at each side of the mandrel with the gripping pads inwards so that they engage the tubing on the mandrel. The belt 9 is driven anti-clockwise and the belt 15 clockwise to progress the tubing along the mandrel. In operation the mandrel 11 is passed into the tubing as it emerges from the extruder and before it reaches the device 13. The mandrel 11 is then secured to the mandrel of the extruder.

A second caterpillar haul-off generally indicated at 16 is disposed remotely from the extruder 10 and is provided with belts 17 and 18, similar to the belts 14 and 15. The belt 17 is driven anti-clockwise. The belts of the caterpillar haul-off 16 are driven at about one-half the speed of the belts of the caterpillar haul-off 13 so that the tubing is compressed between the devices 13 and 16 and the belts of the device 13 are driven fractionally faster than the speed of extrusion.

Disposed between the devices 13 and 16 are a heating means 19 and a cooling means 20. The heating means 19 is disposed nearer to the device 13 and the cooling means nearer the device 16. The heating means is shown as a heating oven but any suitable means may be employed. Similarly the cooling means shown as a cooling coil may be replaced by other suitable means. The tubing is softened in the heater to assist compression and is set in the cooling device.

FIG. 2 shows in longitudinal section a tube manufactured according to the process and with the aid of apparatus according to the invention. The compressed flexible corrugated tubing is shown at 21 and is provided with a covering 22 of high density polythene braiding.

Hose constructed in accordance with the invention is found to combine the properties desirable in a hose for vacuum cleaners and like purposes. It is exceptionally light and is free from noise or whistle in operation. It has great flexibility and has the property of resisting bending beyond its desirable bending radius. It has excellent resistance to crushing and recovers its form and shape after being subjected to excessive loading or crush. It also resists abrasion and is completely air-tight at the same time offering little resistance to airflow. There is very little resistance to turning in ordinary use and the hose can be manufactured at a competitive price.

I claim: belts

1. Apparatus for the manufacture of flexible compressed corrugated tubing comprising extruder means for extruding tubing of a plastics material, said tubing having annular corrugations longitudinally thereof; first haul-off means for engaging and feeding said corrugated tubing emerging from said extruder means, said first haul-off means being positioned downstream from said extruder means; heating means for heating said tubing, said heating means being positioned downstream from said first haul-off means and spaced from said corrugated tubing; second haul-off means for engaging and moving said corrugated tubing, said second haul-off means being positioned downstream from said heating means; first and second drive means connected respectively to said first and second haul-off means for respectively driving said first haul-off means and said second haul-off means at first and second feed rates, said second feed being substantially slower than said first feed rate so as to cause compression of said tube; cooling means positioned between said heating means and said second haul-off means for cooling and setting the compressed corrugated tube; mandrel means secured to said extruder for supporting said corrugated tubing, said mandrel means extending at least beyond said cooling means, and said cooling means being disposed in spaced relation from said mandrel.

2. The apparatus as set forth in claim 1 wherein said second feed rate is substantially one-half that of said first feed rate.

3. The apparatus set forth in claim 1 wherein said first and second haul-off means each comprise pairs of endless belts provided with frictional gripping means and disposed on diametrically opposite sides of said mandrel.

* * * * *